(12) United States Patent
Saitoh et al.

(10) Patent No.: US 7,956,956 B2
(45) Date of Patent: Jun. 7, 2011

(54) LIQUID CRYSTAL DISPLAY DEVICE

(75) Inventors: Yukito Saitoh, Minami-Ashigara (JP);
Yusuke Ohashi, Minami-Ashigara (JP);
Katsufumi Ohmuro, Minami-Ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 296 days.

(21) Appl. No.: 12/160,453

(22) PCT Filed: Jan. 10, 2007

(86) PCT No.: PCT/JP2007/050538
§ 371 (c)(1),
(2), (4) Date: Jul. 10, 2008

(87) PCT Pub. No.: WO2007/081035
PCT Pub. Date: Jul. 19, 2007

(65) Prior Publication Data
US 2010/0165257 A1      Jul. 1, 2010

(30) Foreign Application Priority Data

Jan. 13, 2006   (JP) ................................ 2006-006369

(51) Int. Cl.
*G02F 1/1347*   (2006.01)
*G02F 1/1335*   (2006.01)
*G02F 1/1337*   (2006.01)

(52) U.S. Cl. ............ 349/75; 349/99; 349/102; 349/117; 349/119; 349/129

(58) Field of Classification Search .................... 349/99, 349/102, 75, 117, 119, 121, 129
See application file for complete search history.

(56) References Cited

U.S. PATENT DOCUMENTS

| | | | |
|---|---|---|---|
| 6,034,754 A * | 3/2000 | Sato et al. ...................... 349/102 |
| 6,558,759 B2 * | 5/2003 | Chandrasekhar et al. ..... 428/1.3 |
| 7,586,569 B2 * | 9/2009 | Yano et al. ..................... 349/117 |
| 2002/0145698 A1 | 10/2002 | Imai et al. |
| 2005/0030447 A1 * | 2/2005 | Hsu et al. ....................... 349/102 |
| 2006/0061709 A1 * | 3/2006 | Lin .................................. 349/99 |

FOREIGN PATENT DOCUMENTS

| | | |
|---|---|---|
| JP | 2002-014353 A | 1/2002 |
| JP | 2004-516359 A | 6/2004 |
| JP | 2005-283612 A | 10/2005 |
| JP | 2005-331909 A | 12/2005 |

\* cited by examiner

*Primary Examiner* — Uyen-Chau N Le
*Assistant Examiner* — Chris H Chu
(74) *Attorney, Agent, or Firm* — Buchanan Ingersoll & Rooney PC

(57) ABSTRACT

An ECB-mode liquid crystal display device having a pair of substrates 9 and 12, a liquid crystal layer 11, a pair of polarizing plates (1,3,5) (16,18,20) and at least one optically anisotropic layer 7 and/or 14, wherein they are disposed such that the absorption axes 4 and 19 of the polarizing films 3 and 18 in the polarizing plates are parallel or vertical to the left-rightward direction of the screen of the display device. The orientation axes 10 and 13 of the substrates 9 and 12 and the orientation axes 8 and 15 of the optically anisotropic layers 7 and 14 preferably cross the absorption axes 4 and 19 of the polarizing films 3 and 18 of the adjacent polarizing plates at an angle of 45°.

3 Claims, 3 Drawing Sheets

LIQUID CRYSTAL DISPLAY DEVICE

TECHNICAL FIELD

The present invention relates to a liquid crystal display device of ECB mode having wide viewing angle properties with excellent durability.

BACKGROUND ART

As a display device for use in electronic office equipment such as a word processor, a notebook personal computer or a monitor for a personal computer, a mobile terminal or a TV set, CRT (cathode ray tube) has mainly been used. In recent years, liquid crystal display devices have been popularly used taking the place of CRT due to their thin thickness, light weight and small electric power required. The liquid crystal display device contains a liquid crystal cell and a polarizing plate. The polarizing plate usually comprises a protective film and a polarizing film and is obtained by dyeing a polarizing film comprising a polyvinyl alcohol film with iodine, stretching the dyed film and laminating a protective film on each side of the stretched film. With a transmission type liquid crystal display device, this polarizing plate is disposed on both sides of a liquid crystal cell and, in some cases, one or more optically-compensatory sheets are disposed thereon. Also, with a reflection type liquid crystal display device, a reflection plate, a liquid crystal cell, one or more optically-compensatory sheets and a polarizing plate are usually disposed in this order. The liquid crystal cell usually comprises liquid crystal molecules, two sheets of substrates for sealing the molecules and an electrode layer for applying an electric voltage to the liquid crystal molecules. The liquid crystal cell performs ON-OFF display based on difference of alignment state of the liquid crystal molecules and can be applied to any of transmission type, reflection type and semi-transmission type liquid crystal display devices. There have been proposed display modes such as TN (Twisted Nematic) mode, IPS (In-Plane Switching) mode, OCB (Optically Compensatory Bend) mode, VA (Vertically Aligned) mode, ECB (Electrically Controlled Birefringence) mode and STNJ (Super Twisted Nematic) mode.

An optically-compensatory sheet is used in various liquid crystal display devices for the purpose of avoiding coloration of image and enlarging the viewing angle. As the optically-compensatory sheet, there have conventionally been used a stretched birefringent polymer film. It has been proposed to use, in place of the optically-compensatory sheet comprising a stretched birefringent film, an optically-compensatory sheet having an optically anisotropic layer formed on a transparent support from a low molecular or high molecular liquid crystalline compound. Since liquid crystalline compounds can be in various alignments, use of the liquid crystalline compound has enabled one to realize optical properties that can not be provided by the conventional stretched birefringent polymer films. Further, such optically-compensatory sheet can also function as a protective film for a polarizing plate.

Optical properties of the optically-compensatory sheet are determined by optical properties of a liquid crystal cell, specifically, depending upon the difference in display mode. Use of the liquid crystalline compounds enables one to produce optically-compensatory sheets having various optical properties corresponding to various display modes. Optically-compensatory sheets using liquid crystalline compounds corresponding to various display modes have already been proposed. For example, an optically-compensatory sheet which can be used for an ECB-mode liquid crystal cell performs such optical compensation that, when a voltage is applied, liquid crystal molecules are in an alignment of being inclined with respect to the substrate plane with dissolving the hybrid structure, thus improving viewing properties with respect to contrast by preventing leakage of light in the oblique direction upon black display.

Thus, with the ECB-mode liquid crystal display devices, viewing angle properties have been improved. With conventional liquid crystal display devices, however, a problem has not yet been solved that polarizing plates suffer shrinkage when used in a severe environment, for example, a high-temperature or high-humidity environment and, as a result, leakage of light is caused.

Such leakage of light is caused by shrinkage of the polarizing plate, and there is an example that the leakage of light can be decreased by selecting materials of an adhesive for the polarizing plate (see JP-T-2004-516359 (the term "JP-T" as used herein means a published Japanese translation of a PCT patent application)).

DISCLOSURE OF THE INVENTION

However, with conventional ECB-mode liquid crystal display devices, shrinkage of the polarizing plate causes retardation in a protective film for the polarizing plate, leading to large leakage of light that can not be completely prevented only by selecting an adhesive. Thus, an object of the invention is to provide an ECB-mode liquid crystal display device having a simple constitution and yet having an improved reliability when used in a severe environment regardless of materials of the polarizing plate.

In the invention, this problem has been solved by shifting the shrinking direction of the polarizing plate from the direction in which leakage of light is maximal. That is, this problem can be solved by changing the disposition in the ECB mode from the conventional disposition wherein the absorption axis of the polarizing plate is crossed with the left-rightward direction at an angle of 45° with respect to the screen to the disposition wherein the absorption axis is crossed at an angle of 90° (vertical) or 0° (parallel). In this occasion, left-rightward viewing angle properties can be improved to a satisfactory level by appropriately changing the orientation axis of the optically anisotropic layer and the orientation axis of the substrate of liquid crystal cell with respect to the absorption axis of the polarizing plate.

That is, means for solving the problem is as follows.

(1) A liquid crystal display device, which comprises:
a liquid crystal cell that comprises:
a pair of substrates oppositely disposed with each other,
  wherein at least one of the pair of substrates has an electrode; and
a liquid crystal layer, which is disposed between the pair of substrates, comprising a nematic liquid crystal material containing a liquid crystal molecule,
  wherein when the liquid crystal display device is not driven, the liquid crystal molecule of the nematic liquid crystal material is aligned in a direction approximately parallel to a surface of the substrate due to an orientation axis that a facing surface of each of the pair of substrates has, and
  when the liquid crystal display device is driven, the liquid crystal molecule is alignment-controlled by a longitudinal electric field generated by the electrode, and an angle between an average alignment direction in an upper interface of the liquid crystal layer and an average alignment direction in a lower interface of the liquid crystal layer is almost 0;

a pair of polarizing plates disposed so as to sandwich the liquid crystal cell, wherein the polarizing plate comprises: a polarizing film; and a protective film provided on at least one side of the polarizing film; and at least one optically anisotropic layer provided between the liquid crystal cell and at least one of the pair of polarizing plates, wherein the optically anisotropic layer comprises a liquid crystalline compound that is alignment-controlled by an orientation axis of the optically anisotropic layer and fixed in an aligned state, wherein an absorption axis of the polarizing film and a left-rightward direction with respect to a screen of the liquid crystal display device are parallel or vertical to each other.

(2) The liquid crystal display device as described in (1) above, wherein an absorption axis of a polarizing film comprised in at least one of the pair of the polarizing plates and an orientation axis of one of the pair of substrates disposed nearer to the at least one of the pair of the polarizing plates cross each other at an angle of 45°.

(3) The liquid crystal display device as described in (1) or (2) above, wherein an alignment-controlling direction of the optically anisotropic layer and an absorption axis of the polarizing film comprised in the adjacent polarizing plate cross each other at an angle of 45°.

(4) The liquid crystal display device as described in any of (1) to (3) above, wherein the optically anisotropic layer is disposed only between the liquid crystal cell and one of the pair of the polarizing plates.

BEST MODE FOR CARRYING OUT THE INVENTION

Figure 1:
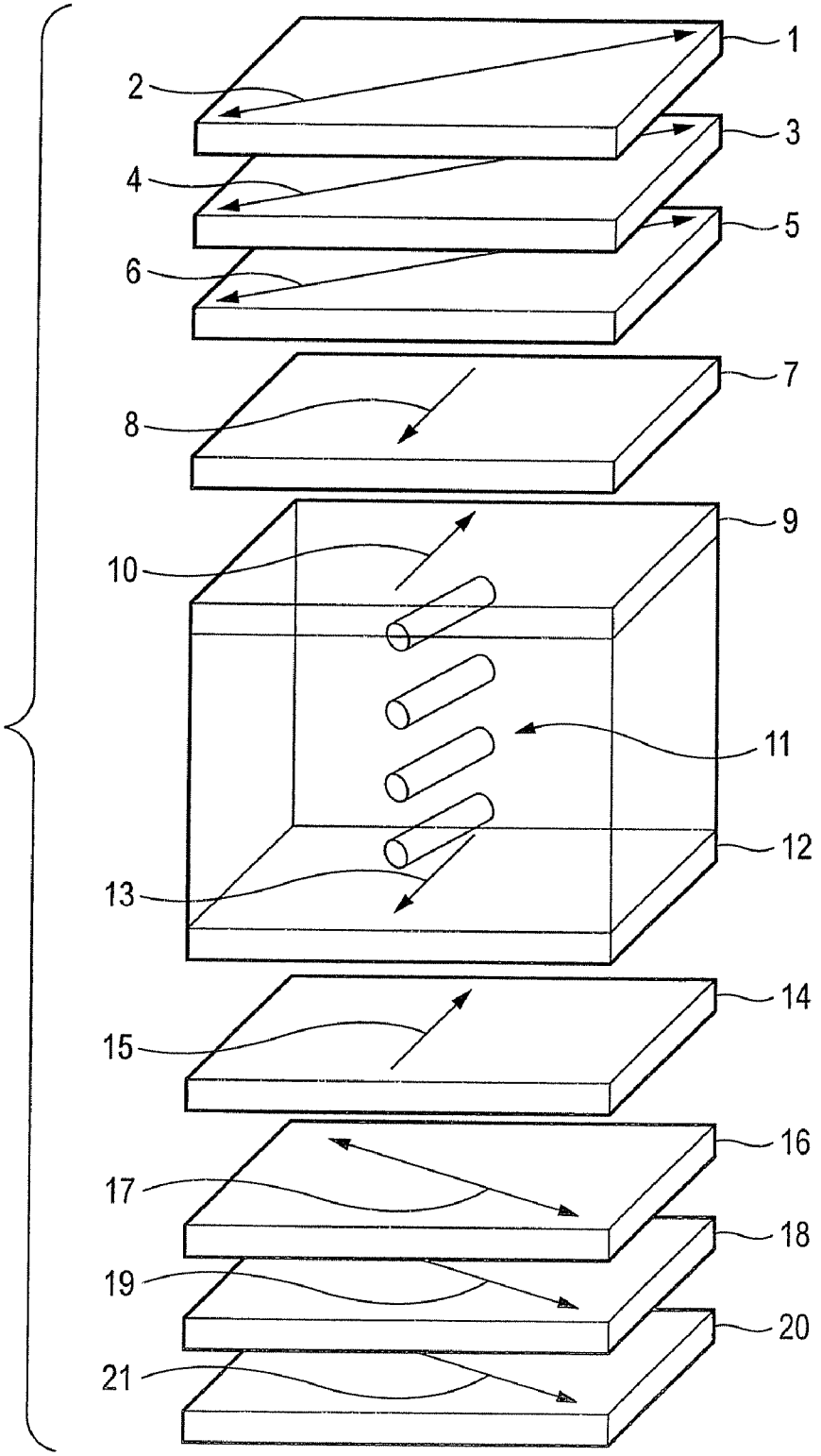
FIG. 1 is a schematic view showing one exemplary example of a conventional ECB-mode liquid crystal display device.

Terms used in this specification will be described below.
(Retardation, Re, Rth)

In this specification, the protective film and the optically anisotropic layer have Re and Rth, and $Re_{(\lambda)}$ can be measured by irradiating with an incident light of λnm in wavelength in the normal direction of the film using KOBRA 21ADH (manufactured by Ohji Measurement Co., Ltd.). $Rth_{(\lambda)}$ can be calculated by KOBRA 21ADH based on retardation values measured in three direction, i.e., the $Re_{(\lambda)}$, a retardation value measured by irradiating with an incident light of λnm in the direction inclined at an angle of +40° from the normal direction of the film with taking the slow axis in plane (determined by KOBRA 21ADH) as an inclination axis (rotation axis), and a retardation value measured by irradiating with an incident light of λnm in wavelength in the direction inclined at an angle of −40° from the normal line of the film with taking the slow axis in plane as an inclination axis (rotation axis), an assumed value of average refractive index, and an inputted film thickness. Here, as the assumed value of average refractive index, those described in a polymer handbook (John Wiley & Sons, Inc.) and catalogues of various optical films can be used. As to films whose average refractive index is unknown, it can be known by measuring with an Abbe's refractometer. Values of average refractive index of main films are illustrated below.

Cellulose acylate (1.48), cycloolefin polymer (1.52), polycarbonate (1.59), polymethyl methacrylate (1.49) and polystyrene (1.59).

nx, ny and nz are calculated by imputing these assumed average refractive index values and the film thickness into KOBRA 21ADH. $Nz=(nx-nz)/(nx-ny)$ can further be calculated from the thus-calculated nx, ny and nz.

In this specification, "+" used with respect to angle means the counterclockwise direction, and "−" means the clockwise direction. Also, when the upward direction of a liquid crystal display device is expressed as the 12-hour direction and the downward direction thereof is expressed as the 6-hour direction, an absolute value of 0° in angle direction means the 3-hour direction (rightward direction of the screen). The term "slow axis" as used herein means the direction in which the refractive index becomes maximal. The term "visible light region" as used herein means a region of from 380 nm to 780 nm. Further, the wavelength of light used for measuring refractive index is 550 nm in the visible light region unless otherwise specified.

Regarding descriptions of disposition or crossing angle between each axis and direction given in this specification, terms "parallel", "vertical", "0°", "90°" and "45°" without showing specific ranges mean "approximately parallel", "approximately vertical", "approximately 0°", "approximately 90°" and approximately "45°", respectively and are not used in a strict sense. Some deviations within a range of providing respective effects are acceptable. For example, "parallel" or "0°" means that the crossing angle is approximately 0°, and is from 0° to 10°, preferably from 0° to 5°, more preferably from 0° to 3°. The term "vertical" or "90" means that the crossing angle is approximately 90°, and is from 80° to 90°, preferably from 85 to 90, more preferably from 87° to 90°. "45°" means that the crossing angle is approximately 45°, and is from 35° to 55°, preferably from 40° to 50°, more preferably from 42 to 48°.

The invention will be described in detail below.

With an ECB-mode liquid crystal display device comprising: a pair of substrates oppositely disposed with each other in which at least one of the pair of substrates has an electrode; a liquid crystal layer, which is disposed between the pair of substrates, comprising a nematic liquid crystal material containing a liquid crystal molecule in which when the device is not driven, the liquid crystal molecule of the nematic liquid crystal material is aligned in a direction approximately parallel to the surface of the substrate due to the orientation axis that the facing surface of each of the pair of substrates has, and when the device is driven, the liquid crystal molecule is alignment-controlled by the longitudinal electric field generated by the electrode, and the angle between the average alignment direction in the upper interface of the liquid crystal layer and the average alignment direction in the lower interface of the liquid crystal layer is almost 0; a pair of polarizing plates disposed so as to sandwich the liquid crystal layer in which the polarizing plate comprises a polarizing film and a protective film provided on at least one side of the polarizing film; and at least one optically anisotropic layer provided between the liquid crystal layer and at least one of the pair of polarizing plates and containing a liquid crystalline compound that is alignment-controlled by the orientation axis of the optically anisotropic layer and fixed in the aligned state, wherein the absorption axis of the polarizing film and the left-rightward direction with respect to the screen of the display device are parallel or vertical to each other, the invention reduces leakage of light from the periphery of the polarizing plate even when the display device is used in a severe environment (high temperature and high humidity), for example, at a temperature of 40° C. and a humidity of 80% (or at a temperature of 40° C. and a humidity of 90%, or at a temperature of 65° C. and a humidity of 80%), by disposing so that the absorption axis of the polarizing film and the direction in which shrinkage of the polarizing plate is maximal, i.e., the direction of the longer side or shorter side of the edges of the polarizing plate (or the left-rightward direction of the screen of the display device) become parallel or vertical to each other. Further, wide viewing angle properties can be obtained by adjusting the dispositional angular relation of the orientation axis of the liquid crystal cell substrates and the alignment-controlling direction of the optically anisotropic layer.

As a result of intensive investigations, the inventor has found that, with conventional ECB-mode liquid crystal display devices, leakage of light in the periphery of the polarizing plate is caused by generation of retardation Re and Rth in the protective film of the polarizing plate due to photoelastic effect caused by shrinkage of the polarizing plate, and found that the leakage of light can be reduced by adjusting the dispositional angular relation among the orientation axis of the liquid crystal cell substrate, the alignment-controlling direction of the optically anisotropic layer for optical compensation and the absorption axis of the polarizing plate.

A polarizing plate suffers shrinkage in a severe environment. In particular, shrinkage becomes maximal in the direction parallel to the longer side and the shorter side of the screen. A film used for the polarizing plate undergoes change in retardation when an elastic force such as shrinkage or elongation is applied thereto. When the absorption axis of the polarizing plate is crossed at an angle of 45° with the direction in which retardation is generated, transmission of light becomes maximal, which is viewed as leaked light.

In the invention, it has been found that the leakage of light can be reduced remarkably with a display device having an ECB-mode liquid crystal layer. In a conventional ECB-mode liquid crystal display device, the absorption axis of the polarizing plate is crossed at an angle of 45° with the left-rightward direction of the screen, i.e., the direction of the longer side of the edges of the polarizing plate (FIG. 1). Since the shrinkage direction of the polarizing plate is parallel to the longer side and the shorter side of the edges of the polarizing plate, this disposition leads to maximum leakage of light.

Thus, it has been found that leakage of light with an ECB-mode liquid display device can be reduced by disposing so that the absorption axis of the polarizing plate becomes parallel or vertical to the left-rightward direction of the screen, i.e., the direction of the longer side of the edges of the polarizing plate.

In order to perform display with a highly-fine, high-contrast, high image quality, the ECB-mode liquid crystal display device employs TFT driving. In TFT driving, gate wiring and signal (or source) wiring are disposed in a direction parallel or vertical to the screen. Since the shrinkage direction of the polarizing plate is parallel or vertical to the wiring, disposing so that the absorption axis of the polarizing plate becomes parallel or vertical to the wiring is equal to disposing so that the absorption axis becomes parallel or vertical to the direction in which shrinkage of the polarizing plate becomes maximal, i.e., the direction of the longer side and the shorter side of the edges of the polarizing plate, thus leakage of light being reduced.

Further, in order to obtain a wide viewing angle with the ECB-mode liquid crystal display device, it serves to cross the absorption axis of at least one of the pair of polarizing plates at an angle of 45° with the orientation axis of the substrate on the side of at least one polarizing plate.

The leakage of light in the periphery of the polarizing plate can be reduced by disposing so that the absorption axis of the polarizing plate becomes parallel or vertical to the left-rightward direction of the screen, i.e., the direction of the longer side of the edges of the polarizing plate. Almost symmetrical viewing angle properties in the left-rightward direction can be obtained by setting the alignment-controlling direction of the ECB-mode liquid crystal display device, i.e., the orientation axis of the substrate of the liquid crystal cell at an angle of 45°.

With conventional ECB-mode liquid crystal display devices, the alignment-controlling direction is set in the up-downward direction of the screen, and the up-downward viewing angle properties are asymmetrical, though the left-rightward viewing angle properties are symmetrical. However, they suffered leakage of light in the periphery of the polarizing plate when used in a severe environment.

Next, an embodiment wherein the invention is applied to an ECB-mode liquid crystal display device will be described below by reference to drawings.

In order to describe the invention, first, operation of a liquid crystal display device shown in FIG. 1, which is a conventional example, is described taking a general ECB-mode liquid crystal display device as an example. Here, description is made with an example wherein TFT (active) driving is performed using a nematic liquid crystal having a positive dielectric anisotropy as a field-effect liquid crystal.

A liquid crystal cell 9 to 13 comprises an upper substrate 9, a lower substrate 12 and a liquid crystal layer sandwiched therebetween and formed by liquid crystal molecules 11. On the surface of each of the substrates 9 and 13 in contact with the liquid crystal molecules 11 (hereinafter also referred to as "inner surface") is formed an orienting film (not shown), and alignment of the liquid crystal molecules 11 when no or low voltage is applied is controlled by a rubbing treatment performed on the orienting film. Also, on the inner surface of each of the substrates 9 and 12 is formed a transparent electrode (not shown) through which a voltage can be applied to the liquid crystal layer comprising the liquid crystal molecules 11.

With the ECB-mode liquid crystal display device, the liquid crystal molecules 11 in the liquid crystal cell are aligned approximately parallel to the substrate plane in a non-driven state when no driving voltage is applied across the electrodes, with the alignment direction not being twisted between the upper substrate and the lower substrate. With a transmission type display device, light from a back-light acquires linear polarization. This linear polarization becomes elliptic polarization depending upon the degree of retardation generated in the liquid crystal layer and the optically anisotropic layer. The degree of retardation can be changed by changing the voltage applied to the liquid crystal layer. Thus, the amount of light transmittable through the liquid crystal display device can be controlled by the sum of the retardation values of the optically anisotropic layers 7 and 14 disposed between the liquid crystal layer and the polarizing plate (in this case, the sign being minus) and the retardation values of the liquid crystal layer (in this case, the sign being plus). For example, on the lower voltage side, the retardation value of the liquid crystal layer is larger than the retardation value of the optically anisotropic layer, and the polarization state becomes elliptic polarization (ideally linear polarization wherein the axis rotates 90° from the incident polarized light), thus the display device giving a white display.

On the other hand, as the applied voltage is increased, the liquid crystal molecules gradually rise to approach to the direction vertical to the substrate plane. In this occasion, when the sum of the retardation values of the optically anisotropic layers 7 and 14 (in this case, the sign being minus) and the retardation value of the liquid crystal layer (in this case, the sign being plus) becomes approximately 0, the light of linear polarization on the incident side reaches the polarizing plate on the exit light side without changing the polarization state, and hence the incident light is introduced with an angle crossing at right angles to the absorption axis on the exit light side. Hence, the light is interrupted to give a black display.

As is described above, an ECB-mode liquid crystal display device functions as a display device by interrupting or transmitting a polarized light. Generally, a ratio of white display luminance to black display luminance is defined as a contrast ratio which is used as a numerical value showing display quality. A display device having a higher contrast ratio has a higher quality and, in order to increase the contrast, it is important to pass the light with keeping its polarization state in the liquid crystal display device.

One example of an ECB-mode liquid crystal cell structure is shown below. A liquid crystal cell is prepared by disposing liquid crystal having a positive dielectric anisotropy of $\Delta\delta$=about +8.5 and a refractive index anisotropy of $\Delta n$=0.0854 (589 nm, 20° C.) between the upper substrate 9 and the lower substrate 12 with a rubbing alignment. The alignment of the liquid crystal layer is controlled by an orienting film and rubbing. The director showing alignment direction of liquid crystal molecules, so-called tilt angle, is preferably set in the range of from about 0.1° to about 10°, with 3° being selected here. Rubbing is performed in the direction crossing at right angles with the upper and lower substrates. The tilt angle can be controlled by selecting strength and number of rubbing. The orienting film is formed by coating and baking a polyimide film. The twist angle of the liquid crystal layer is adjusted to 0°. The thickness of the liquid crystal layer is set to 3 µm.

Also, the liquid crystal material LC is not particularly limited as long as it is a nematic liquid crystal. Regarding the dielectric anisotropy $\Delta\in$, a larger dielectric anisotropy value can reduce the driving voltage. Regarding the refractive index anisotropy $\Delta n$, smaller refractive index anisotropy permits to increase the thickness (gap) of the liquid crystal layer, which serves to shorten the time required for sealing the liquid crystal and reduce unevenness in gap. Also, a larger $\Delta n$ value permits to reduce the cell gap, which can provide high-speed response. In general, $\Delta n$ is set in the range of from 0.04 to 0.28, the cell gap is set in the range of from 1 to 10 µm, and they are adjusted so that the product of $\Delta n$ and d falls between 0.20 and 0.55 µm.

The upper polarizing plate and the lower polarizing plate are laminated so that the absorption axis 4 of the upper polarizing plate crosses at right angles with the absorption axis 19 of the lower polarizing plate and, further, that the absorption axis 4 of the upper polarizing plate makes an angle of 45° with the rubbing direction (orientation axis) of the upper substrate 9 of the liquid crystal cell and the absorption axis 19 of the lower polarizing plate makes an angle of 45° with the rubbing direction (orientation axis) of the lower substrate 12 of the liquid crystal cell. A transparent electrode (not shown) is formed on the inside of each of the orienting films on the upper substrate 9 and the lower substrate 12. In the liquid crystal display device of this example wherein liquid crystal molecules 11 in the liquid crystal cell are aligned approximately parallel to the substrate plane and are in a parallel alignment between the upper and lower substrates in a non-driven state when no driving voltage is applied across the electrodes, a white display is realized when a low voltage is applied, and a black display is realized when a high voltage is applied. A system of this type is in some cases called a normally white system. On the other hand, a system which realizes a black display on a lower voltage side and a white display on a higher voltage side is in some cases called a normally black system. The invention may be applied to either of the systems.

Protective films 5 and 16 on the upper and lower polarizing plates, respectively, disposed on the side nearer to the liquid cell may also function as the supports of the optically anisotropic layers 7 and 14. The upper polarizing plate and the lower polarizing plate may be incorporated in the liquid crystal display device as a structural member of being laminated with the optically anisotropic layers 7 and 14 respectively in a unifying manner. In the liquid crystal display device of the invention, a unified elliptically polarizing plate can be used which has a constitution wherein the transparent support of the optically-compensatory sheet functions also as a protective film for one of the polarizing films, i.e., a transparent protective film, a polarizing film, a transparent protective film (also functioning as a transparent support) and an optically anisotropic layer are laminated in this order. Use of this unified elliptically polarizing plate permits accurate optical compensation of a liquid crystal display device by a simple constitution because it has an optically anisotropic layer having the optical compensation ability. In the liquid crystal display device, the transparent protective film, the polarizing film, the transparent support and the optically anisotropic layer are preferably laminated in this order from the outside of the device (far side from the liquid crystal cell).

The liquid crystal display device of the invention is not limited to the constitution shown in FIG. 1 and may contain other members. For example, a color filter may be disposed between the liquid crystal cell and the polarizing film. Also, in the case of using the device as a transmission type one, a back light having as a light source a cold cathode or hot cathode fluorescent lamp, a light-emitting diode, a field emission element or an electroluminescent element can be disposed on the rear side. The liquid crystal display device of the invention may be of a reflection type and, in such case, it suffices to dispose only one polarizing plate on the viewer's side, and a reflection film is provided on the back side of the liquid crystal cell or on the inner surface of the lower substrate of the liquid crystal cell. It is of course possible to provide a front light using the light source on the viewer's side of the liquid crystal cell. Further, in order to realize both transmission mode and the reflection mode, the liquid crystal display device of the invention may be of a semi-transmission type wherein a reflection part and a transmission part are provided in each pixel of the display device.

Further, in order to enhance the light-emitting efficiency of the back light, it is possible to laminate a prism-shaped or lens-shaped light-condensing type luminance-improving sheet (film) or provide a polarization-reflecting type luminance-improving sheet (film) capable of reducing loss of light due to absorption of a polarizing plate between the back light and the liquid crystal cell. It is also possible to laminate a diffusing sheet (film) for unifying the light source for the back light or, conversely, a sheet (film) on which a reflection or diffusion pattern for imparting an in-plane distribution to the light source is formed by printing.

The liquid crystal display device of the invention includes a directly image-viewing type, an image projection type and a light modulation type. The invention is particularly effective when applied to an active matrix liquid crystal display device using three- or two-terminal semiconductor element such as TFT or MIM. Needless to say, an embodiment is also effective wherein the invention is applied to a passive matrix liquid crystal display device represented by an STN type called time-division driving.

Next, individual members to be used in the liquid crystal display device of the invention will be described below.

In the invention, for optical compensation of a liquid crystal cell, an optically anisotropic layer containing a liquid crystalline compound fixed in an aligned state is used. In the invention, the optically anisotropic layer may be formed on a support to incorporate it as an optically-compensatory sheet in a liquid crystal display device, or the optically-compensatory sheet may be unified with a linear polarization film to incorporate them as an elliptically polarizing plate in a liquid crystal display device. Methods for preparing the optically-compensatory sheet and the polarizing plate having the angles set as described above are not particularly limited, but there are illustrated a method of adjusting alignment-controlling direction or stretching direction with respect to the roll-conveying direction upon preparation of the optically-compensatory sheet or the polarizing plate; and a method of preparing the optically-compensatory sheet and the polarizing plate in a roll-to-roll manner, and punching out with a predetermined angle.

[Optically-Compensatory Sheet]

An example of an optically-compensatory sheet to be used in the invention comprises an optically transparent support having provided thereon an optically anisotropic layer formed by a liquid crystalline compound. A liquid crystal cell can be optically compensated without deteriorating other various properties by using this optically-compensatory sheet in a liquid crystal display device.

Constituents of the optically-compensatory sheet will be described below.

<<Support>>

The optically-compensatory sheet may have a support. A transparent support on which the optically anisotropic layer is provided is not particularly limited as to the direction of the slow axis thereof. However, the direction of the slow axis is preferably from −50° to 50° with respect to the direction in which the liquid crystalline compound is controlled to align, with −45°±5°, 45°±5° or −5° to 5° being preferred. The support is preferably a glass or a transparent polymer film. The support has a light transmittance of preferably 80% or more. Examples of the polymer constituting the polymer film include cellulose esters (e.g., cellulose mono to triacylate derivatives), norbornene series polymers and polymethyl methacrylate. Commercially available polymers (e.g., ARTON and ZEONEX, both being norbornene series polymers) may be used. With polymers which are liable to develop birefringence such as conventionally known polycarbonate or polysulfone, it is preferred to use after modifying the molecules so as to control development of birefringence as described in WO00/26705.

Among them, cellulose esters are preferred, with lower fatty acid esters of cellulose being more preferred. The term "lower fatty acid" as used herein means a fatty acid containing 6 or less carbon atoms. Cellulose acylates containing from 2 to 4 carbon atoms are particularly preferred. Cellulose acetate is particularly preferred. It is also possible to use a mixed fatty acid ester such as cellulose acetate propionate or cellulose acetate butyrate. The viscosity-average polymerization degree of cellulose acetate (DP) is preferably 250 or more, more preferably 290 or more. Also, cellulose acetate preferably has a narrow molecular mass distribution in terms of Mw/Mn (Mw: mass-average molecular mass; Mn: number-average molecular mass) measured by gel permeation chromatography. Specifically, Mw/Mn is preferably from 1.0 to 1.7, more preferably from 1.0 to 1.65.

As to the polymer film, it is preferred to use cellulose acetate having an acetylation degree of from 55.0% to 62.5%, with an acetylation degree of from 57.0 to 62.0% being more preferred. Additionally, the term "acetylation degree" as used herein means the amount of acetic acid bound to cellulose per unit mass of cellulose. The acetylation degree can be determined by measurement and calculation of acetylation degree according to ASTM:D-817-91 (testing method for cellulose acetate).

With cellulose acetate, hydroxyl groups at 2-, 3- and 6-positions of cellulose are not uniformly substituted, and substitution degree at 6-position tends to be smaller. As to polymer film to be used in the invention, it is preferred that the substitution degree at 6-position of cellulose be about the same as or more than that at 2- and 3-positions. The proportion of the substitution degree at 6-position based on the sum of the substitution degrees at 2-, 3- and 6-positions is preferably from 30 to 40%, more preferably from 31 to 40%, most preferably from 32 to 40%. The substitution degree at 6-position is preferably 0.88 or more.

Specific examples of the acyl group and the process for synthesizing the cellulose acylate are described in detail in Hatsumei Kyokai Kokai Giho, Kogi-No. 2001-1745 (published on 15$^{th}$, Mar. 2001), on page 9.

A preferred range of the polymer film retardation value varies depending upon kind of a liquid crystal cell to which the optically-compensatory sheet is applied and upon use thereof. However, the Re retardation value is preferably from 0 to 200 nm, and the Rth retardation value is preferably from 70 to 400 nm. In the case of using two optically anisotropic layers in a liquid crystal display device, the Rth retardation value of the polymer film is preferably in the range of from 70 to 250 nm. In the case of using one optically anisotropic layer in a liquid crystal display device, the Rth retardation value of the substrate is preferably in the range of from 150 to 400 nm.

Additionally, the birefringence index (an: nx-ny) of the substrate film is preferably in the range of from 0.00028 to 0.020. Also, the birefringence index of a cellulose acetate film in the thickness direction $\{(nx+ny)/2-nz\}$ is preferably in the range of from 0.001 to 0.04

In order to adjust retardation of the polymer film, it is a general method to apply an outer force such as stretching. In some cases, a retardation-increasing agent for adjusting optical anisotropy may be added. In order to adjust retardation of a cellulose acylate film, it is preferred to use an aromatic compound having at least 2 aromatic rings as a retardation-increasing agent. The aromatic compound is used in an amount of preferably from 0.01 to 20 parts by mass per 100 parts by mass of cellulose acylate. (In this specification, mass ratio is equal to weight ratio.) It is also possible to use two or more kinds of the aromatic compounds. The aromatic rings of the aromatic compound include aromatic hetero rings in addition to aromatic hydrocarbon rings. Examples thereof include those compounds which are described in EP-A-911656, JP-A-2000-111914 and JP-A-2000-275434.

Further, it is preferred to adjust the hygroscopic expansion coefficient of the cellulose acetate film to be used for the optically-compensatory sheet to $30\times10^{-5}/\%$ RH or less, more preferably $15\times10^{-5}/\%$ RH or less, still more preferably $10\times10^{-5}/\%$ RH or less. A smaller hygroscopic expansion coefficient is more preferred, but is usually $1.0\times10^{-5}/\%$ RH or more. Additionally, the hygroscopic expansion coefficient shows an amount of change in length of a sample upon relative humidity being changed with keeping temperature at a constant level. An increase in transmittance in a frame-like pattern (leakage of light due to distortion) can be prevented with keeping the optically compensating function of the optically-compensatory sheet by adjusting this hygroscopic expansion coefficient.

Method for measuring the hygroscopic expansion coefficient is described below. A sample of 5 mm in width and 20 mm in length was cut out from a prepared polymer film, and was hung in an atmosphere of 25° C. and 20% RH (Ro) with one end of the film being fixed. A 0.5-g mass was hung at the other end thereof, and the sample was left for 10 minutes to measure the length (Lo). Next, the humidity was changed to 80% RH ($R_1$) while keeping the temperature at 25° C., and the length ($L_1$) was measured. The hygroscopic expansion coefficient was calculated according to the following formula. 10 Sample pieces were prepared from each sample film and were measured, with an average value thereof being employed.

Hygroscopic expansion coefficient [/% RH]=$\{(L_1-L_0)/L_0\}/(R_1-R_0)$

In order to reduce dimensional change of the polymer film due to absorption of moisture, addition of a compound having a hydrophobic group or fine particles is preferred. As the compound having a hydrophobic group, a proper material selected from among plasticizers or deterioration-preventing agents having a hydrophobic group such as an aliphatic group or an aromatic group within the molecule is particularly preferably used. The addition amount of the compound is in the range of preferably from 0.01 to 10% by mass based on the mass of a solution to be prepared (dope). Also, it suffices to render the free volume in the polymer film smaller. Specifically, the smaller the amount of residual solvent upon filming according to the solvent casting method to be described hereinafter, the smaller becomes the free volume. Drying is preferably conducted under such conditions that the amount of residual solvent in the cellulose acetate film falls within the range of from 0.01 to 1.00% by mass.

The above-described additives to be added to the polymer film or various additives to be added according to various purposes (e.g., a UV-ray preventing agent, a releasing agent, an antistatic agent, a deterioration-preventing agent (e.g., an antioxidant, a peroxide-decomposing agent, a radical inhibitor, a metal-inactivating agent, an acid scavenger or an amine) and an infrared absorbent) may be solid materials or oily materials. When the film is formed of multi-layers, the kind and the amount of the additive in individual layers may be different. As to details thereof, materials described in the foregoing Kogi-No. 2001-1754, pp. 16-22 are preferably used. The amounts of these additives to be used are not particularly limited so long as their functions can be exhibited, but it is preferred to use them in amounts ranging from 0.001 to 25% by mass based on the mass of the entire film composition.

<<Process for Producing a Polymer Film (Support)>>

The polymer film is preferably produced according to the solvent casting process. In the solvent casting process, a film is produced by using a solution of a polymer material in an organic solvent (dope). The dope is cast onto a drum or a band, and the solvent is evaporated to form a film. The dope before casting is preferably adjusted so that the solid content thereof becomes 18 to 35%. The surface of the drum or band is preferably mirror-finished.

The dope is preferably cast onto the drum or band whose surface temperature is 10° C. or less. The thus-obtained film may be released from the drum or the band and dried with a high-temperature air successively changing the temperature to 100 to 160° C. to thereby evaporate the residual solvent. This process is described in JP-B-5-17844. This process permits to shorten the time between casting and releasing. In order to perform this process, the dope is required to be gelled at the surface temperature of the drum or band upon casting.

In the casting step, one kind of cellulose acylate solution may be cast as a single layer, or two or more kinds of cellulose acylate solutions may be co-cast simultaneously or successively.

As a method for co-casting two or more layers of plural cellulose acylate solutions, there are illustrated, for example, a method of casting solutions containing cellulose acylate through plural casting slits provided at proper intervals in the support-conveying direction to thereby laminate (e.g., a method described in JP-A-11-198285), a method of casting cellulose acylate solutions through two casting slits (a method described in JP-A-6-134933) and a method of enclosing a flow of a highly viscous cellulose acylate solution with a low viscous cellulose acylate solution, and co-extruding the highly viscous cellulose acylate solution and the low viscous cellulose acylate solution (a method described in JP-A-56-162617). The invention is not limited only to these methods. Production steps of the solvent casting process are described in detail in the foregoing Kogi-No. 2001-1745, pp. 22-30 wherein descriptions are classified into dissolution, casting (including co-casting), metal support, drying, releasing and stretching.

The thickness of the film (support) of the invention is preferably from 15 to 120 μm, more preferably from 30 to 80 μm.

<<Surface Treatment of Polymer Film (Support)>>

The polymer film is preferably subjected to surface treatment. Such surface treatment includes corona discharge treatment, glow discharge treatment, flame treatment, acid treatment, alkali treatment and UV-ray irradiation treatment. These are described in detail in the foregoing Kogi-No. 2001-

1745, pp. 30-32. Of these, alkali saponification treatment is particularly preferred and is extremely effective as surface treatment for the cellulose acylate film.

The alkali saponification treatment may be performed in any manner, for example, by dipping in a saponifying solution or by coating a saponifying solution, with the coating method being preferred. Examples of the coating method include a dip coating method, a curtain coating method, an extrusion coating method, a bar coating method and an E-type coating method. As the alkali saponification treatment solution, there are illustrated a potassium hydroxide solution and a sodium hydroxide solution. The normality of hydroxide ion is in the range of preferably from 0.1 to 3.0 N. Wetting properties of the saponifying solution for a transparent support and stability with time of the saponifying solution can be improved by incorporating therein a solvent showing good wetting properties for a film (e.g., isopropyl alcohol, n-butanol, methanol or ethanol), a surfactant and a wetting agent (e.g., a diol or glycerin). Specifically, contents thereon are given in, for example, JP-A-2002-82226 and WO02/46809 pamphlet.

In place of the surface treatment, there may be employed a treatment of forming an undercoat layer in addition to the surface treatment (described in JP-A-7-333433), a single layer-coating treatment of coating only one resin layer containing both a hydrophobic group and a hydrophilic group, such as gelatin layer, or a so-called double-layer coating treatment (described in, e.g., JP-A-11-248940) wherein a layer well adhesive to a high molecular film is provided as a first layer (hereinafter abbreviated as "first undercoat layer) and a hydrophilic resin layer well adhesive to an orienting film is provided as a second layer (hereinafter abbreviated as "second undercoat layer".

<<Orienting Film>>

In the invention, the liquid crystalline compound in the optically anisotropic layer is alignment-controlled by orientation axis and is fixed in such alignment. As the orientation axis which functions to alignment-control the liquid crystalline compound, there is illustrated rubbing axis of an orienting film formed between the optically anisotropic layer and the polymer film (support). In the invention, however, the orientation axis is not limited to the rubbing axis, and may be any one that can control alignment of the liquid crystalline compound like the rubbing axis.

The orienting film has a function of determining the alignment direction of the liquid crystalline compound. Therefore, the orienting film is necessary for realizing a preferred embodiment of the invention. However, once the liquid crystalline compound is fixed in the alignment, the orienting film has completed its function, and hence it is not necessarily indispensable as a constituent of the invention. That is, it is possible to transfer only an optically anisotropic layer having a fixed alignment and formed on an orienting film onto a polarizer to prepare a polarizing plate of the invention.

The orienting film can be provided by such techniques as rubbing treatment of an organic compound (preferably a polymer), inclined vapor deposition of an inorganic compound, formation of a layer having micro-grooves and accumulation of an organic compound (e.g., ω-tricosanoic acid, dioctadecylmethylammonium chloride or methyl stearate) by Langmuir-Blodgett method (LB membrane). Further, there are known orienting films which acquire the orienting ability by applying electric field, applying magnetic field or irradiation with light.

The orienting film is preferably formed by rubbing treatment of a polymer. The polymer to be used as an orienting film has, in principle, a molecular structure having the function of orienting liquid crystalline molecules. In the invention, it is preferred to bind a side chain having a cross-linkable group (e.g., a double bond) to the main chain in addition to the function of orienting liquid crystalline molecules or to introduce a cross-linkable functional group having the function of orienting liquid crystalline molecules into a side chain. As the polymer to be used as the orienting film, either of polymers which themselves can cause cross-linking and polymers which can be cross-linked with a cross-linking agent may be used, and plural combinations thereof may be used as well. Examples of the polymers include methacrylate series copolymers described in JP-A-8-338913, paragraph [0022], styrene series copolymers, polyolefins, polyvinyl alcohol and modified polyvinyl alcohol, poly(N-methylolacrylamide), polyesters, polyimides, vinyl acetate copolymers, carboxymethyl cellulose and polycarbonate. Silane coupling agents may be used as the polymers. Water-soluble polymers (e.g., poly(N-methylolacrylamide), carboxymethyl cellulose, gelatin, polyvinyl alcohol and modified polyvinyl alcohol) are preferred. Of these, gelatin, polyvinyl alcohol and modified polyvinyl alcohol are more preferred, with polyvinyl alcohol and modified polyvinyl alcohol being most preferred. It is particularly preferred to use in combination two or more kinds of polyvinyl alcohols or modified polyvinyl alcohols different in polymerization degree.

The saponification degree of polyvinyl alcohol is preferably from 70 to 100%, more preferably from 80 to 100%. The polymerization degree of polyvinyl alcohol is preferably from 100 to 5,000.

The side chain having the function of orienting liquid crystalline molecules generally has a hydrophobic group as a functional group. Specific kind of the functional group is determined according to the kind of liquid crystalline molecules and necessary alignment state. For example, a modifying group for the modified polyvinyl alcohol can be introduced by copolymerization modification, chain transfer modification or block polymerization modification. Examples of the modifying group include a hydrophilic group (e.g., a carboxylic acid group, a sulfonic acid group, a phosphonic acid group, an amino group, an ammonium group, an amido group or a thiol group), a hydrocarbon group containing from 10 to 100 carbon atoms, a fluorine atom-substituted hydrocarbon group, a thioether group, a polymerizable group (e.g., an unsaturated polymerizable group, an epoxy group or an aziridinyl group) and an alkoxysilyl group (e.g., trialkoxy, dialkoxy or monoalkoxy). As specific examples of the modified polyvinyl alcohol compounds, there are illustrated, for example, those which are described in JP-A-2000-155216, paragraphs [0022] to and JP-A-2002-62426, paragraphs [0018] to [0022].

The polymer of the orienting film and a multi-functional monomer contained in the optically anisotropic layer can be copolymerized with each other by binding a side chain having a cross-linkable functional group to the main chain of the orienting polymer or by introducing a cross-linkable functional group into the side chain having the function of orienting liquid crystalline molecules. As a result, strong covalent bonds are formed between the orienting polymers and between the multi-functional monomer and the orienting film polymer in addition to between the multi-functional monomers. Therefore, the strength of the optically-compensatory sheet can markedly be improved by introducing a cross-functional group into the orienting polymer.

The cross-linkable functional group of the orienting film polymer preferably contains a polymerizable group similarly with the multi-functional monomer. Specifically, there are illustrated, for example, those which are described in JP-A-2000-155216, paragraphs [0080] to [0100].

Alternatively, the orienting film polymer can also be cross-linked by using a cross-linking agent instead of introducing the cross-linkable functional group. Examples of the cross-linking agent include aldehydes, N-methylol compounds, dioxane derivatives, compounds capable of activating carboxyl group to function, active vinyl compounds, active halogen compounds, isoxazoles and dialdehyde starch. Two or more kinds of cross-linking agents may be used in combination thereof. Specifically, there are illustrated, for example, compounds described in JP-A-2002-62426, paragraphs [0023] to [0024]. Highly reactive aldehydes are preferred, with glutaraldehyde being particularly preferred.

The addition amount of the cross-linking agent is preferably from 0.1 to 20% by mass, more preferably from 0.5 to 15% by mass, based on the mass of the polymer. The amount of unreacted cross-linking agent remaining in the orienting film is preferably 1.0% by mass or less, more preferably 0.5% by mass or less. A sufficient durability of the orienting film can be obtained without generation of reticulation even when the orienting film is used for a long period in a liquid crystal display device or when left for a long period under an atmosphere of high temperature and high humidity, by adjusting the amounts as described above.

The orienting film can fundamentally be obtained by coating a composition containing the polymer for forming an orienting film and a cross-linking agent on a transparent support, heating it to dry (cause cross-linking), and subjecting the coated film to a rubbing treatment. As has been described hereinbefore, the cross-linking reaction can be conducted at any stage after coating the coating solution on the transparent support. In the case of using a water-soluble polymer such as polyvinyl alcohol as an orienting film-forming material, the solvent for the coating solution is preferably a mixed solvent of an organic solvent having defoaming action (e.g., methanol) and water. The ratio of water:methanol by mass is preferably from 0:100 to 99:1, more preferably from 0:100 to 91:9, whereby generation of foam can be depressed, and defects of the orienting film and, further, defects of the surface of an optically anisotropic layer can markedly be reduced.

As a method of coating the orienting film, a spin coating method, a dip coating method, a curtain coating method, an extrusion coating method, a rod coating method or a roll coating method is preferred, with a rod coating method being particularly preferred. The dry thickness of the orienting film is preferably from 0.1 to 10 μm. Heat-drying can be conducted at a temperature of from 20° C. to 110° C. In order to perform sufficient cross-linking, the temperature is preferably from 60° C. to 100° C., particularly preferably from 80° C. to 100° C. The drying can be completed in 1 minute to 36 hours, with 1 minute to 30 minutes being preferred. The pH is preferably set to a level optimal for a cross-linking agent to be used. When glutaraldehyde is used, the pH is from 4.5 to 5.5, particularly preferably 5.

The orienting film is provided on a transparent support or the undercoat layer. The orienting film can be obtained by cross-linking the polymer layer as described above, and subjecting the layer to a rubbing treatment.

As the rubbing treatment, a treatment that is widely employed as a treating step for orienting a liquid crystal of LCD can be applied. That is, a method of obtaining orientation by rubbing the surface of the orienting film in a definite direction with paper, gauze, felt, rubber, or nylon or polyester fibers. Generally, the rubbing treatment is performed by rubbing several times with cloth on which fibers of uniform length and thickness have been provided uniformly.

Next, liquid crystalline molecules of the optically anisotropic layer provided on the orienting film are oriented utilizing the function of the orienting film. Then, as needed, the orienting film polymer is reacted with the multi-functional monomer contained in the optically anisotropic layer or, alternatively, the orienting film polymer is cross-linked with a cross-linking agent. The thickness of the orienting film is preferably from 0.1 to 10 μm.

<<Optically Anisotropic Layer>>

Next, a preferred embodiment of an optically anisotropic layer comprising a liquid crystalline compound will be described in detail below. The optically anisotropic layer is preferably designed so as to compensate the liquid crystal compound in a liquid crystal cell of a liquid crystal display device upon black display. The alignment state of the liquid crystal compound in the liquid crystal cell upon black display differs depending upon the mode of the liquid crystal display device. Regarding this alignment state of the liquid crystal compound in the liquid crystal cell, descriptions are given in IDW'00, FMC7-2, pp. 411-414. The optically anisotropic layer contains a liquid crystalline compound which is alignment-controlled by the orientation axis such as rubbing axis and fixed in the alignment.

Examples of the liquid crystalline molecules to be used in the optically anisotropic layer include rod-like liquid crystalline molecules and discotic liquid crystalline molecules. The rod-like liquid crystalline molecules and the discotic liquid crystalline molecules may be either high molecule liquid crystal or low molecular liquid crystal and, further, include those which are formed by cross-linking a low molecular liquid crystal and do not show liquid crystal properties any more. In the case where a rod-like liquid crystalline compound is used for preparing the optically anisotropic layer, the rod-like liquid crystalline molecules are preferably in a state wherein average direction of longer axes of the molecules projected on the support surface is parallel to the orientation axis. Also, in the case where a discotic liquid crystalline compound is used for preparing the optically anisotropic layer, the discotic liquid crystalline molecules are preferably in a state wherein average direction of shorter axes of the molecules projected on the support surface is parallel to the orientation axis. Also, a nybrid alignment to be described hereinafter is preferred wherein an angle (tilt angle) between the discotic plane and the layer plane changes in the depth direction.

<<Rod-Like Liquid Crystalline Molecules>>

As the rod-like liquid crystalline molecules, molecules of azometines, azoxy compounds, cyanobiphenyl compounds, cyanophenyl esters, benzoic acid esters, phenyl cyclohexanecarboxylates, cyanophenylcyclohexanes, cyano-substituted phenylpyrimidines, alkoxy-substituted phenylpyrimidines, phenyldioxanes, tolans and alkenyllcyclohexylbenzonitriles are preferred.

Additionally, the rod-line liquid crystalline molecules include metal complexes. Also, liquid crystal polymers containing a rod-like liquid crystalline molecule in a repeating unit can be used as the rod-like liquid crystalline molecules. In other words, the rod-like liquid crystalline molecules may be bound to a (liquid crystal) polymer.

Regarding the rod-like liquid crystalline molecules, related descriptions are given in quarterly published Kagaku Sosetsu, vol. 22, Ekisho no Kagaku (1994), compiled by Nihon Kagaku Kyokai, chapters 4, 7 and 11; and Ekisho Device Handbook, compiled by Nihon Gakujutsu Shinko-kai, 142th Iinkai, chapter 3.

The birefringence index of the rod-like liquid crystalline molecules is preferably in the range of from 0.001 to 0.7.

In order to fix the alignment state, the rod-like liquid crystal molecules preferably have a polymerizable group. As the polymerizable group, a radical-polymerizable unsaturated group or a cation-polymerizable group is preferred. Specifically, there are illustrated, for example, those polymerizable groups and polymerizable liquid crystal compounds which are described in JP-A-2002-62427, paragraphs [0064] to [0086].

<<Discotic Liquid Crystalline Molecules>>

The discotic liquid crystalline molecules include molecules of benzene derivatives described in the research report of C. Destrade et al., Mol. Cryst. vol. 71, p. 111 (1981); truxene derivatives described in the research report of C. Destrade et al., Mol. Cryst. vol. 122, p. 141 (1985) and Physics lett. A, vol. 78, p. 82 (1990); cyclohexane derivatives described in Angew. Chem., vol. 96, p. 70 (1984); and azacrown series or phenylacetyrene series macrocyclic compounds described in the research report of J. M. Lehn et al., J. Chem. Commun., p. 1794 (1985), the research report of J. Zhang et al., and J. Am. Chem. Soc., vol. 116, p. 2655 (1994).

The discotic liquid crystalline molecules include molecules of compounds showing liquid crystalline properties having a structure wherein a mother nucleus located at the molecular center are radially substituted by straight-chain alkyl groups, alkoxy groups or substituted benzoyloxy groups. Those compounds are preferred whose molecules or agglomerate of molecules have rotationally symmetrical properties and can provide a definite alignment. With the optically anisotropic layer to be formed from the discotic liquid crystalline molecules, it is not necessarily indispensable for the compound contained in the optically anisotropic layer to maintain its discotic liquid crystalline properties in the resultant layer and, for example, those compounds are also included which are first low molecular discotic liquid crystalline compounds having a thermo- or photo-reactive group and are finally polymerized or cross-linked by heat or light to form a polymer that does not behave as liquid crystal. Preferred examples of the discotic liquid crystalline compounds are described in JP-A-8-50206. Polymerization of the discotic liquid crystalline molecules is described in JP-A-8-27284.

In order to fix the discotic liquid crystalline molecules by polymerization, it is necessary to bind a polymerizable group as a substituent to the discotic core of each discotic liquid crystalline molecule. Compounds wherein a discotic core and a polymerizable group are connected to each other through a linking group are preferred. Such compounds can maintain the alignment state even in the polymerization reaction. There are illustrated, for example, compounds described in JP-A-2000-155216.

In hybrid alignment, the angle between the discotic plane of the discotic liquid crystalline molecule and the plane of a polarizing film increases or decreases as the distance from the plane of the polarizing film in the depth direction of the optically anisotropic layer increases. The angle preferably increases as the distance increases. Further, as to change in the angle, a continuously increasing change, a continuously decreasing change, an intermittent increase, an intermittent decrease, a change including both continuous increase and continuous decrease, and an intermittent change including increase and decrease are possible. The intermittent change contains a region in the middle of the depth direction where the tilt angle does not change. It suffices for the angle to change increasingly or decreasingly as a whole even when there is a region where the angle does not change. Further, it is preferred for the angle to change continuously.

The average direction of the longer axis of the discotic liquid crystalline molecule on the polarizing film side can generally be adjusted by properly selecting the discotic liquid crystalline molecules or the material of the orienting film or by properly selecting the rubbing treatment. The direction of the discotic plane of the discotic liquid crystalline molecule on the surface side (air side) can generally be adjusted by properly selecting the discotic liquid crystalline molecules or both the discotic liquid crystalline molecules and the kind of an additive. Examples of the additive to be used together with the discotic liquid crystalline molecules include plasticizers, surfactants, polymerizable monomers and polymers. The degree of change in alignment of the longer axis can also be adjusted by properly selecting the liquid crystalline molecules and the additive as is the same with that described above.

<<Other Additives in the Optically Anisotropic Layer>>

A plasticizer, a surfactant or a polymerizable monomer can be used together with the liquid crystalline molecules to improve uniformity of a coated film, film strength and alignment properties of the liquid crystalline molecules. As such additives, those which have compatibility with the liquid crystalline molecules and can cause change in the tilt angle of the liquid crystalline molecules or do not inhibit alignment are preferred.

As the polymerizable monomer, there are illustrated radical-polymerizable or cation-polymerizable compounds. Multi-functional radical-polymerizable monomers are preferred, and those which are copolymerizable with a liquid crystal compound having the above-described polymerizable group are preferred. For example, there are illustrated those which are described in JP-A-2002-296423, paragraphs [0018] to [0020]. The addition amount of the compound is in the range of generally from 1 to 50% by mass, preferably from 5 to 30% by mass, based on the mass of the discotic liquid crystalline molecules.

As the surfactants, there are illustrated conventionally known compounds, with fluorine-containing compounds being particularly preferred. Specifically, there are illustrated, for example, those compounds which are described in JP-A-2001-330725, paragraphs [0028] to [0056].

Polymers to be used together with the discdotic liquid crystalline compound can preferably cause change in tilt angle of the discotic liquid crystalline molecules.

Examples of the polymers include cellulose esters. Preferred examples of the cellulose esters include those which are described in JP-A-2000-155216, paragraph In order not to inhibit alignment of liquid crystalline molecules, the addition amount of the polymer is in the range of preferably from 0.1 to 10% by mass, more preferably from 0.1 to 8% by mass, based on the mass of the liquid crystalline molecules. The discotic-nematic, liquid crystal phase-solid phase transition temperature is preferably from 70 to 300° C., more preferably from 70 to 170° C.

<<Formation of an Optically Anisotropic Layer>>

The optically anisotropic layer can be formed by coating on an orienting film a coating solution containing liquid crystalline molecules and, as needed, a polymerization initiator or optional components to be described hereinafter.

As a solvent to be used for preparing the coating solution, organic solvents are preferably used. Examples of the organic solvents include amides (e.g., N,N-dimethylformamide), sulfoxides (e.g., dimethylsulfoxide), hetero ring compounds (e.g., pyridine), hydrocarbons (e.g., benzene and hexane), alkyl halides (e.g., chloroform, dichloromethane and tetrachloroethane), esters (e.g., methyl acetate and butyl acetate), ketones (e.g., acetone and methyl ethyl ketone) and ethers (e.g., tetrahydrofuran and 1,2-dimethoxyethane). Of these, alkyl halides and ketones are preferred. Two or more kinds of the organic solvents may be used in combination thereof.

Coating can be performed by a known method (e.g., a wire bar coating method, an extrusion coating method, a direct gravure coating method, a reverse gravure coating method or a die coating method).

The thickness of the optically anisotropic layer is preferably from 0.1 to 20 μm, more preferably from 0.5 to 15 μm, most preferably from 1 to 10 μm.

<<Fixation of the Alignment State of Liquid Crystalline Molecules>>

Aligned liquid crystalline molecules can be fixed with the alignment being maintained. The fixation is preferably performed by polymerization reaction. Such polymerization includes thermal polymerization reaction and photo polymerization reaction, with photo polymerization being preferred. Examples of a photo polymerization initiator include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), multi-nuclear quinine compounds (described in U.S. Pat. Nos. 3,046,127 and 2,951,758), a combination of triarylimidazole dimmer and p-aminophenylketone (described in U.S. Pat. No. 3,549,367), acridine and phenazine compounds (described in JP-A-60-105667 and U.S. Pat. No. 4,239,850) and oxadiazole compounds (described in U.S. Pat. No. 4,212,970).

The amount of the photo polymerization initiator is in the range of preferably from 0.01 to 20% by mass, more preferably from 0.5 to 5% by mass.

Irradiation with light for polymerizing liquid crystalline molecules is performed preferably by using UV rays. The irradiation amount is in the range of preferably from 20 $mJ/cm^2$ to 50 $J/m^2$, more preferably from 20 to 5,000 $mJ/cm^2$, still more preferably from 100 to 800 $mJ/cm^2$. In order to accelerate the photo polymerization reaction, irradiation with light may be performed under heating.

Additionally, a protective layer may be provided on the optically anisotropic layer.

<<Elliptically Polarizing Plate>>

In the invention, an elliptically polarizing plate wherein the optically anisotropic layer is unified with a linear polarizing film may be used. The elliptically polarizing plate is formed preferably in approximately the same form as a pair of substrates constituting a liquid crystal cell so as to be incorporated as such in a liquid crystal display device. (For example, when the liquid crystal cell is in a rectangular form, the elliptically polarizing plate is formed preferably in the same rectangular form.) In the invention, the orientation axis of the substrate of the liquid crystal cell is adjusted to make a specific angle with the absorption axis of the linear polarizing film and/or the orientation axis of the optically anisotropic layer.

The elliptically polarizing plate can be prepared by laminating the optically-compensatory sheet and a linear polarizing film (hereinafter, mere reference to "polarizing film" means "linear polarizing film") one over the other. The optically-compensatory sheet may also function as a protective film.

The linear polarizing film is preferably a coating type polarizing film represented by Optiva Inc. or a polarizing film comprising a binder and iodine or a dichroic dye. Iodine and the dichroic dye in the linear polarizing film develop polarizing ability by alignment in the binder. It is preferred for iodine and the dichroic dye to align along binder molecules, or for the dichroic dye to align in one direction due to self organization. An currently commercially available polarizer is generally prepared by dipping a stretched polymer in a solution of iodine or a dichlroic dye contained in a bath to thereby impregnate iodine or the dichroic dye into the binder.

With commercially available polarizing films, iodine or a dichroic dye is distributed to a depth of about 4 μm (about 8 μm altogether on both sides) from the polymer surface and, in order to obtain a sufficient polarizing performance, the film is required to have a thickness of at least 10 μm. The penetration degree can be controlled by selecting concentration of a solution of iodine or a dichroic dye, temperature of the bath and dipping time. The lower limit of the thickness of the binder is preferably 10 μm as described above. In view of leakage of light from a liquid crystal display device, the smaller the upper limit of the thickness, the more preferred. The thickness is preferably equal to or less than the thickness of a currently commercially available polarizing plate (about 30 μm), and is preferably 25 μm or less, more preferably 20 μm or less. When the thickness is 20 μm or less, the light leakage phenomenon is not observed any more with a 17-inch liquid crystal display device.

The binder in the polarizing film may be cross-linked. As the cross-linked polymer, a polymer which itself can cause cross-linking can be used. A polarizing film can be formed by causing reaction between binder molecules of a polymer having a functional group or binder molecules obtained by introducing a functional group into a polymer through irradiation with light, heating or changing pH. It is also possible to introduce a cross-linking structure into a polymer with a cross-linking agent. Cross-linking is generally performed by coating a coating solution containing a polymer or a mixture of a polymer and a cross-linking agent on a transparent support, followed by heating. Since it suffices to secure durability at a stage of final product, the cross-linking treatment may be conducted at any stage before obtaining a final polarizing plate.

As a binder for the polarizing film, either of a polymer which itself can cause cross-linking and a polymer which can be cross-linked with a cross-linking agent can be used. As examples of the polymer, there are illustrated the same polymers as have been described with respect to the orienting film. Polyvinyl alcohols and modified polyvinyl alcohols are most preferred. Regarding modified polyvinyl alcohols, descriptions are given in JP-A-8-338913, JP-A-9-152509 and JP-A-9-316127. Polyvinyl alcohols and modified polyvinyl alcohols may be used in combination of two or more thereof.

The addition amount of the cross-linking agent for the binder is preferably from 0.1 to 20% by mass based on the mass of the binder. Alignment properties of the polarizer and moist heat resistance of the polarizing film are improved.

The orienting film contains an unreacted cross-linking agent in a certain amount even after completion of the cross-linking reaction. However, the amount of residual cross-linking agent is preferably 1.0% by mass or less, more preferably 0.5% by mass or less, in the orienting film. Thus, reduction of polarizing degree can be avoided when the polarizing film incorporated in a liquid crystal display device is used for a long period of time or left in an atmosphere of high temperature and high humidity for a long period of time.

Regarding the cross-linking agents, descriptions are given in U.S. Reissued Pat. No. 23297. Boron compounds (e.g., boric acid or borax) can also be used as the cross-linking agent.

As the dichroic dye, azo series dyes, stylbene series dyes, pyrazolone series dyes, triphenylmethane series dyes, quinoline series dyes, oxazine series dyes, thiazine series dyes and anthraquinone series dyes are used. The dichroic dyes are preferably water-soluble. The dichroic dyes preferably have a hydrophilic substituent (e.g., sulfo, amino or hydroxyl).

As examples of the dichroic dyes, there are illustrated, for example, compounds described in the foregoing Kogi No. 2001-1745, p. 58.

In order to raise the contrast ratio of a liquid crystal display device, a polarizing plate having a higher transmittance is more preferred, with a higher polarizing degree being more preferred. The transmittance of the polarizing plate for a light of 550 nm in wavelength is in the range of preferably from 30 to 50%, more preferably from 35 to 50%, most preferably from 40 to 50%. The polarizing degree for a light of 550 nm in wavelength is in the range of preferably from 90 to 100%, more preferably from 95 to 100%, most preferably from 99 to 100%.

<<Preparation of an Ecliptically Polarizing Plate>>

With a stretching method, the stretch ratio is preferably from 2.5 to 30.0 times the original, more preferably from 3.0 to 10.0 times the original. Stretching can be performed according to dry stretching in the air. Also, wet stretching in a state of being dipped in water may be performed. The stretch ratio for the dry stretching is preferably from 2.5 to 5.0 times the original, and the stretch ratio for the wet stretching is preferably from 3.0 to 10.0 times the original. The stretching step may be dividedly conducted in several steps including an inclined stretching step. Dividing the stretching step into several steps permits more uniform stretching upon stretching with a high stretch ratio. It is be possible to conduct some stretching in a transverse or longitudinal direction (to a degree of preventing shrinkage in the width direction) before conducting inclined stretching. Stretching can be performed by conducting tenter stretching in biaxial stretching with speeds on the left and right sides of the film being different. The biaxial stretching is the same as a stretching method employed in common film-forming methods. Since stretching is conducted with speeds on the left and right sides of the film being different, it is necessary for a binder film before stretching to be different in thicknesses between the left side and the right side thereof. In a cast-filming method, a flow amount of a binder solution on the left side and that on the right side can be made different from each other by using a tapered die.

With a rubbing method, a rubbing treatment method having widely been employed as a treatment step for orienting liquid crystal of LCD can be applied. That is, alignment can be obtained by rubbing the surface of a film in a definite direction using paper, gauze, felt, rubber, or nylon or polyester fibers. Generally, the rubbing treatment is performed by rubbing several times with cloth on which fibers of uniform length and thickness have been provided uniformly. It is preferred to perform the rubbing treatment using a rubbing roll of 30 μm or less in roundness coefficient, cylindricity and run-out (eccentricity). The wrap angle of the film for a rubbing roll is preferably from 0.1 to 90°. However, as is described in JP-A-8-160430, it is possible to perform stable rubbing treatment by wrapping 360° or more.

In the case of subjecting a continuous sheet to the rubbing treatment, it is preferred to convey the film at a velocity of from 1 to 100 m/min with applying thereto a definite tension by means of a conveying apparatus. Preferably, the rubbing roll is freely rotatable in the horizontal direction with respect to the film-running direction so as to set the rubbing angle at any degree. It is preferred to select a proper rubbing angle in the range of from 0 to 60°. In the case of using the film in a liquid crystal display device, the rubbing angle is preferably from 40 to 50°, particularly preferably 45°.

It is preferred to provide a polymer film on the opposite surface of the linear polarizing film to the optically anisotropic layer side (i.e., in the order of optically anisotropic layer/polarizing film/polymer film).

The polymer film preferably has provided on the outermost surface thereof an antireflection film having stain-proof properties and scratching resistance. As the antireflection film, any of conventionally known ones can be used.

EXAMPLES

The invention will be described more specifically by reference to Examples. Materials, reagents, amounts of substances and proportions thereof, operation, etc. can properly be changed without departing from the spirit of the invention. Therefore, the scope of the invention is not restricted by the following specific examples.

Example 1

Figure 2:
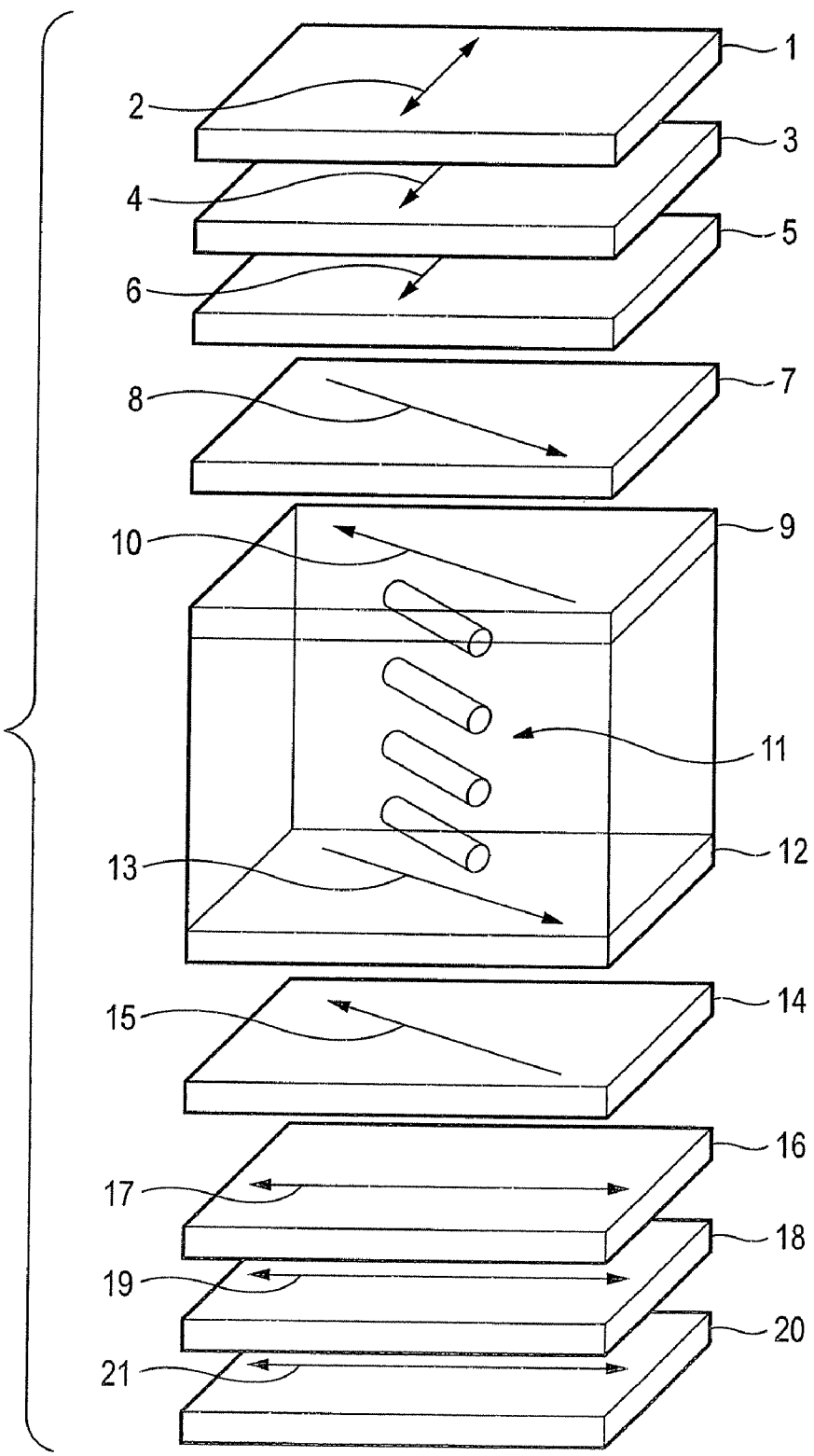
FIG. 2 is a schematic view showing one exemplary example of an ECB-mode liquid crystal display device of the invention.

A liquid crystal display device of the structure shown in FIG. 2 was prepared. That is, an upper (elliptically) polarizing plate (comprising a protective film 1, a polarizing film 3, a protective film 5 (also functioning as an optically-compensatory sheet support) and an optically anisotropic layer 7), a liquid crystal cell (comprising an upper substrate 9, a liquid crystal layer 11 and a lower substrate 12), a lower (elliptically) polarizing plate (comprising an optically anisotropic layer 14, a protective film 16 (also functioning as an optically-compensatory sheet support), a polarizing film 18 and a protective film 20) were laminated in this order from the viewer's side (upside), and a back light (not shown) using a cold cathode fluorescent lamp was disposed under the lower polarizing plate.

Methods for preparing individual members used are described below.

<<Preparation of the Liquid Crystal Cell>>

The cell gap (d) of the liquid crystal cell was adjusted to 3 μm, and a liquid crystal material having a positive dielectric constant anisotropy was dropwise injected into the space between the substrates to form the liquid crystal layer 11 having Δn·d of 260 nm (Δn being a refractive index anisotropy). Also, the rubbing direction (orienting axis) 10 of the upper substrate 9 (on the viewer's side) of the liquid crystal cell was adjusted to 135°, and the rubbing direction (orienting axis) 13 of the lower substrate 12 (on the back light side) was adjusted to 315°, with the twist angle being 0°. Thus, an ECB-mode liquid crystal cell was prepared.

<<Preparation of the Optically-Compensatory Sheet>>

The following composition was placed in a mixing tank and stirred under heating to dissolve individual components. Thus, a cellulose acetate solution was prepared.

| Formulation of the cellulose acetate solution | |
|---|---|
| Cellulose acetate of 60.7 to 61.1% in acetylation degree | 100 parts by mass |
| Triphenyl phosphate (plasticizer) | 7.8 parts by mass |
| Biphenyldiphneyl phosphate (plasticizer) | 3.9 parts by mass |
| Methylene chloride (first solvent) | 336 parts by mass |
| Methanol (second solvent) | 29 parts by mass |
| 1-Butanol (third solvent) | 11 parts by mass |

To another mixing tank were placed 16 parts by mass of the following retardation-increasing agent, 92 parts by mass of methylene chloride and 8 parts by mass of methanol, and the resulting mixture was stirred under heating to prepare a solution of the retardation-increasing agent. 474 Parts by mass of the cellulose acetate solution was mixed with 25 parts by mass of the solution of the retardation-increasing agent, and sufficiently stirred to prepare a dope. The addition amount of the retardation-increasing agent was 6.0 parts by mass per 100 parts by mass of cellulose acetate.

Retardation-Increasing Agent

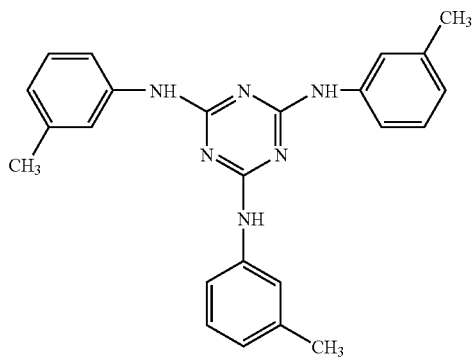

The thus-obtained dope was cast using a band casting machine. When the film temperature on the band was decreased to 40° C., the film was dried for 1 minute with a 70° C. hot blast, then for 10 minutes with a 140° C. drying blast to thereby form a cellulose acetate film (thickness: 80 μm) containing 0.3% by mass of the residual solvent. Re retardation value and Rth retardation of the prepared cellulose acetate film (transparent support, transparent protective film) at a wavelength of 546 nm were measured. Re was found to be 8 nm, and Rth was found to be 78 nm. The thus-prepared cellulose acylate film was dipped in a 2.0N potassium hydroxide solution (25° C.) for 2 minutes, then neutralized with sulfuric acid, washed with pure water, then dried. Thus, a cellulose acetate film for a transparent protective film was prepared.

<Preparation of an Orienting Film for an Optically Anisotropic Layer>

On this cellulose acetate film was coated a coating solution of the following formulation in an amount of 28 mL/m2 using #16 wire bar coater, followed by drying for 150 seconds with 90° C. hot air. Subsequently, the formed film was subjected to rubbing treatment so as to align in the direction of 45° with respect to the in-plane slow axis (parallel to the casting direction). (Accordingly, the alignment-controlling direction (rubbing axes) 8 and 15 of the optically anisotropic layers 7 and 14 crosses the slow axes 6 and 17 of the cellulose acetate film 5 and 16 at an angle of 45°. See FIG. 2.)

Formulation of the Coating Solution for Forming the Orienting Film

| | |
|---|---|
| Modified polyvinyl alcohol shown below | 20 parts by mass |
| Water | 360 parts by mass |
| Methanol | 120 parts by mass |
| Glutaraldehyde (cross-linking agent) | 1.0 part by mass |

Modified polyvinyl alcohol

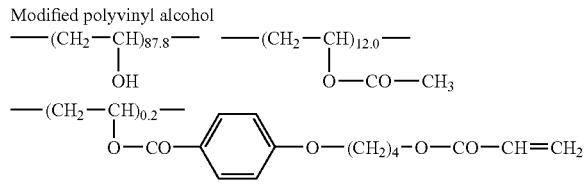

<Preparation of an Optically Anisotropic Layer>

On the orienting film was coated a coating solution of 91.0 g of the following discotic liquid crystalline compound, 9.0 g of ethylene oxide-modified trimethylolpropane triacrylate (V#360; manufactured by Osaka Yuki Kagaku K.K.), 2.0 g of cellulose acetate butyrate (CAB551-0.2; manufactured by Eastman Chemical Co.), 0.5 g of cellulose acetate butyrate (CAB531-1; manufactured by Eastman Chemical Co.), 3.0 g of a photo polymerization initiator (Irgacure 907; manufactured by Ciba Geigy), 1.0 g of a sensitizing agent (Kayacure DETX; manufactured by Nippon Kayaku) and 1.3 g of a fluoro-aliphatic group-containing copolymer (Megafac F780; manufactured by Dainippon Ink & Chemicals, Inc.) dissolved in 207 g of methyl ethyl ketone in an amount of 6.2 ml/m² using #3.6 wire bar. This was heated for 2 minutes in a 130° C. isothermal zone to align the discotic liquid crystalline compound. Subsequently, it was irradiated with UV light for 1 minute in an atmosphere of 60° C. using a 120 W/cm high-pressure mercury lamp to thereby polymerize the discotic compound. Then, it was allowed to cool to room temperature. Thus, an optically anisotropic layer was formed to prepare an optically-compensatory sheet.

Liquid Crystalline Compound

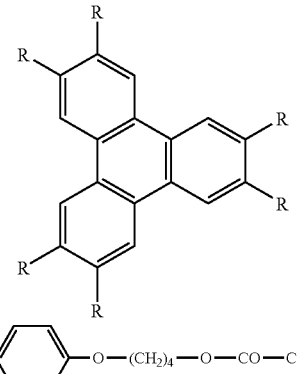

R: —O—CO—⌬—O—(CH₂)₄—O—CO—CH═CH₂

When the polarizing plate was disposed in a cross-Nicol position to observe unevenness of the resulting optically-compensatory sheet, no unevenness was found from the in-plane direction and from the direction inclined 60° from the normal line.

<<Preparation of (Elliptically) Polarizing Plate>>

Iodine was adsorbed by a stretched polyvinyl alcohol film to prepare a polarizing film, and the prepared optically-compensatory sheet was stuck onto one side of the polarizing film with the support side of the sheet facing the polarizing film using a polyvinyl alcohol series adhesive. Also, a 80-μm thick cellulose triacetate film (TD-80U; manufactured by Fuji Photo Film Co., Ltd.) was subjected to saponification treatment and was stuck to the opposite side of the polarizing film using a polyvinyl alcohol series adhesive so that the absorption axis of the polarizing film becomes parallel to the slow axis (parallel to the casting direction) of the support of the optically-compensatory sheet. (Accordingly, absorption axes 4 and 19 of the polarizing films 3 and 18 cross the alignment-controlling direction (rubbing axis) 8 and 15 of the optically anisotropic layers 7 and 14 at an angle of 45°. See FIG. 2.) A polarizing plate was cut out so that the longer or shorter side thereof became parallel to the slow axis of the support. Thus, there was prepared an (elliptically) polarizing plate.

<<Preparation of a Liquid Crystal Display Device>>

The thus-prepared elliptically polarizing plate was stuck onto each of the viewer's side and the backlight side of the prepared ECB cell through an adhesive in such manner that the absorption axis of the polarizing film becomes vertical or parallel to the left-rightward direction of the screen of a display device. In this occasion, the alignment-controlling direction of the optically anisotropic layer is adjusted so as to become parallel (reverse direction) to the alignment-controlling direction (rubbing direction) of the substrate of a facing liquid crystal cell. Thus, a liquid crystal display device was prepared.

That is, in this Example, the absorption axis 4 of the polarizing film 3 in the upper polarizing plate, the slow axes 2 and 6 of the protective films 1 and 5 in the upper polarizing plate were set to 90°, whereas the absorption axis 19 of the polarizing film 18 in the lower polarizing plate, the slow axes 17 and 21 of the protective films 16 and 20 in the lower polarizing plate were set to 0°. Also, the alignment-controlling direction 8 of the upper optically anisotropic layer 7 was set to 315°, whereas the alignment-controlling direction 15 of the lower optically anisotropic layer 14 was set to 135°.

<Optical Measurement of the Prepared Liquid Crystal Display Device>

A 60-Hz rectangular wave voltage was applied to the thus-prepared liquid crystal display device. The device was made normally white mode wherein white display was given by applying 1.5 V and black display was given by applying 5 V. As a measuring machine, EZ-Contrast 160D (manufactured by ELDIM) was used, and the transmittance ratio (white display/black display), i.e., contrast ratio, was measured. The frontal contrast ratio was found to be 1000:1. When difference in luminance was measured between the center area of the panel and the center portion of the longer side edge of the polarizing plate upon black display after storing the device for 24 hours in an environment testing room of 40° C. and 80%, then leaving for one hour at room temperature, it was found to be 0.1 cd/m$^2$. No leakage of light was visually observed in the periphery of the polarizing plate. Also, the viewing angle in which the contrast ratio in the left-rightward direction was 10 or more was 80° on the left side and 80° on the right side.

Example 2

Figure 3:
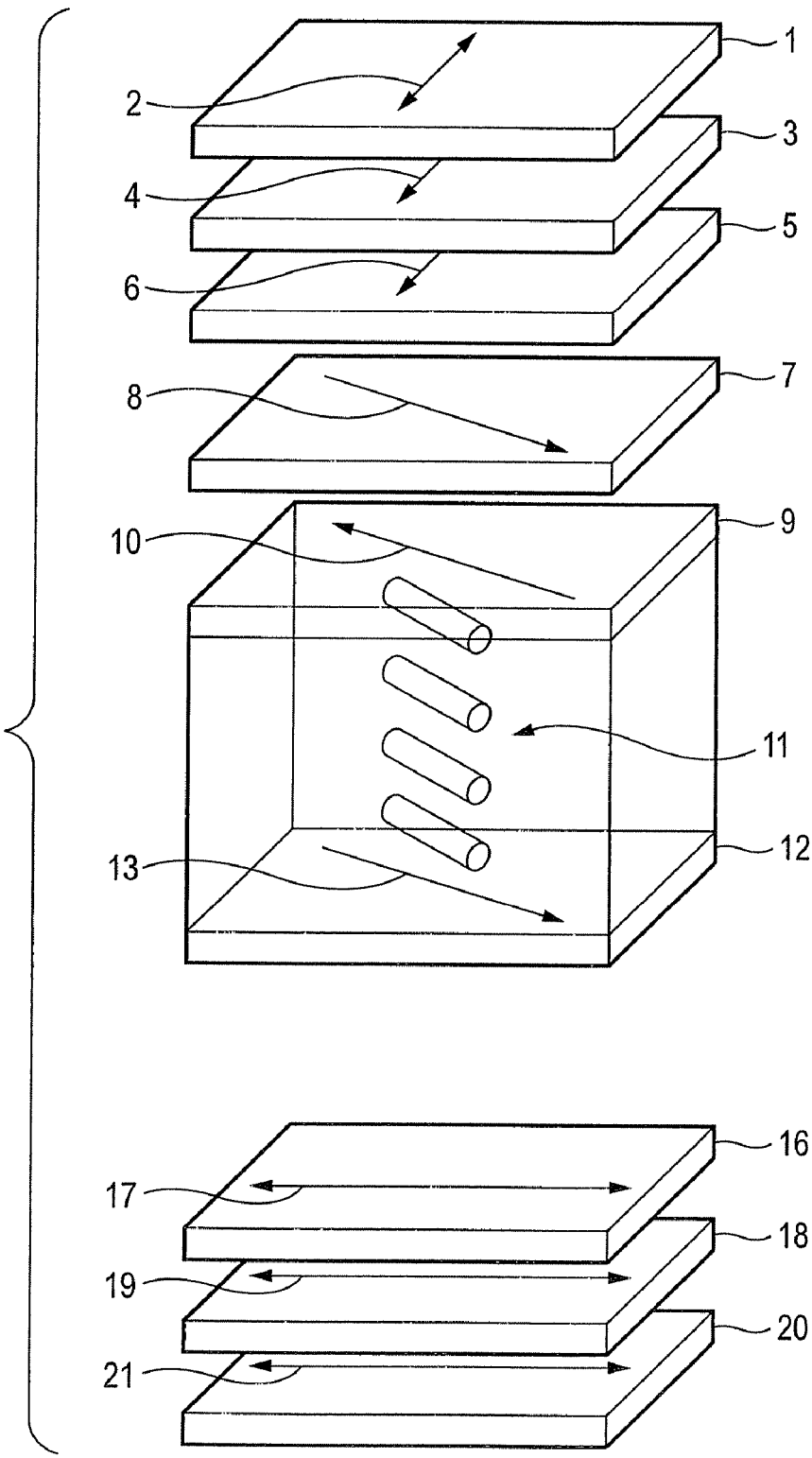
FIG. 3 is a schematic view showing one exemplary example of an ECB-mode liquid crystal display device of the invention, wherein 1 denotes an outer-side protective layer for an upper polarizing plate; 2 denotes a slow axis of the outer-side protective layer for the upper polarizing plate; 3 denotes a polarizing film in the upper polarizing plate; 4 denotes an absorption axis of the polarizing film in the upper polarizing plate; 5 denotes a protective film for the upper polarizing plate on the liquid crystal cell side (support for an optically-compensatory sheet); 6 denotes a slow axis of the protective film for the upper polarizing plate on the liquid crystal cell side; 7 denotes an upper optically anisotropic layer; 8 denotes an alignment-controlling direction (orientation axis) of the upper optically anisotropic layer; 9 denotes an upper substrate for the liquid crystal cell; 10 denotes a liquid crystal alignment-controlling direction (orientation axis) of the upper substrate; 11 denotes liquid crystal molecules (liquid crystal layer); 12 denotes a lower substrate for the liquid crystal cell; 13 denotes a liquid crystal alignment-controlling direction (orientation axis) of the lower substrate; 14 denotes a lower optically anisotropic layer; 15 denotes an alignment-controlling direction (orientation axis) of the lower optically anisotropic layer; 16 denotes a protective film for the lower polarizing plate on the liquid crystal cell side (support for an optically-compensatory sheet); 17 denotes a slow axis of the protective film for the lower polarizing plate on the liquid crystal cell side; 18 denotes a polarizing film in the lower polarizing plate; 19 denotes an absorption axis of the polarizing film in the lower polarizing plate; 20 denotes an outer protective film for the lower polarizing plate; and 21 denotes a slow axis of the outer protective film for the lower polarizing plate

A liquid crystal display device of the structure shown in FIG. 3 was prepared. The structure was the same as shown in Example 1 except for omitting the lower optically anisotropic layer 14.

When difference in luminance was measured between the center area of the panel and the center portion of the longer side edge of the polarizing plate upon black display after storing the device for 24 hours in an environment testing room of 40° C. and 80%, then leaving for one hour at room temperature, it was found to be 0.1 cd/m$^2$. No leakage of light was visually observed in the periphery of the polarizing plate. Also, the viewing angle in which the contrast ratio in the left-rightward direction was 10 or more was 60° on the left side and 60° on the right side.

Comparative Example 1

A liquid crystal display device of the structure shown in FIG. 1 was prepared. The structure was the same as shown in Example 1 except for rotating all angles −45° in the counterclockwise direction.

When difference in luminance was measured between the center area of the panel and the center portion of the longer side edge of the polarizing plate upon black display after storing the device for 24 hours in an environment testing room of 40° C. and 80%, then leaving for one hour at room temperature, it was found to be 0.5 cd/m$^2$. No leakage of light was visually observed in the periphery of the polarizing plate. Also, the viewing angle in which the contrast ratio in the left-rightward direction was 10 or more was 80° on the left side and 80° on the right side.

INDUSTRIAL APPLICABILITY

The invention can provide an ECB-mode liquid crystal display device having improved reliability that leakage of light will not be caused at the periphery of a polarizing plate even when used in a severe environment employing the same constitution as that of the conventional display devices by disposing the absorption axis of the polarizing film so as to be parallel or vertical to the left-rightward direction of the screen of the display device.

The entire disclosure of each and every foreign patent application from which the benefit of foreign priority has been claimed in the present application is incorporated herein by reference, as if fully set forth.

The invention claimed is:

1. A liquid crystal display device, which comprises:
   a liquid crystal cell that comprises:
      a pair of substrates oppositely disposed with each other, wherein at least one of the pair of substrates has an electrode; and
      a liquid crystal layer, which is disposed between the pair of substrates, comprising a nematic liquid crystal material containing a liquid crystal molecule,
         wherein when the liquid crystal display device is not driven, the liquid crystal molecule of the nematic liquid crystal material is aligned in a direction approximately parallel to a surface of the substrate due to an orientation axis that a facing surface of each of the pair of substrates has, and
         when the liquid crystal display device is driven, the liquid crystal molecule is alignment-controlled by a longitudinal electric field generated by the electrode, and an angle between an average alignment direction in an upper interface of the liquid crystal layer and an average alignment direction in a lower interface of the liquid crystal layer is almost 0;
   a pair of polarizing plates disposed so as to sandwich the liquid crystal cell, wherein the polarizing plate comprises: a polarizing film; and a protective film provided on at least one side of the polarizing film; and
   an optically-compensatory sheet which is provided between the liquid crystal cell and at least one of the pair of polarizing plates and comprises a support and an optically anisotropic layer,
      wherein the optically anisotropic layer comprises a liquid crystalline compound that is alignment-controlled by an orientation axis of the optically anisotropic layer and fixed in an aligned state, and a direction of a slow axis of the support and a direction in which the liquid crystalline compound is alignment-controlled cross each other at an angle of 45°,
   wherein an absorption axis of the polarizing film and a left-rightward direction with respect to a screen of the liquid crystal display device are parallel or vertical to each other,
   wherein the alignment-controlling direction of the optically anisotropic layer and an absorption axis of the polarizing film comprised in the adjacent polarizing plate cross each other at an angle of 45°.

2. The liquid crystal display device according to claim 1, wherein an absorption axis of a polarizing film comprised in at least one of the pair of the polarizing plates and an orientation axis of one of the pair of substrates disposed nearer to the at least one of the pair of the polarizing plates cross each other at an angle of 45°.

3. The liquid crystal display device according to claim 1, wherein the optically anisotropic layer is disposed only between the liquid crystal cell and one of the pair of the polarizing plates.

* * * * *